(12) United States Patent
Yamashita

(10) Patent No.: US 7,422,801 B2
(45) Date of Patent: Sep. 9, 2008

(54) ELECTROLUMINESCENT FLUORESCENT SUBSTANCE

(75) Inventor: Seiji Yamashita, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 417 days.

(21) Appl. No.: 11/158,086

(22) Filed: Jun. 22, 2005

(65) Prior Publication Data
US 2005/0287395 A1    Dec. 29, 2005

(30) Foreign Application Priority Data
Jun. 24, 2004   (JP)   ............... 2004-186626
Jul. 30, 2004   (JP)   ............... 2004-223781

(51) Int. Cl.
*B32B 9/00*    (2006.01)
*B32B 19/00*   (2006.01)

(52) U.S. Cl. ...................... 428/690; 257/611

(58) Field of Classification Search ............. None
See application file for complete search history.

(56) References Cited

U.S. PATENT DOCUMENTS

| 4,263,339 A | 4/1981 | Fischer et al. |
| 4,684,353 A | 8/1987 | DeSouza |
| 5,643,496 A | 7/1997 | Brese et al. |
| 6,248,261 B1 | 6/2001 | Takemura et al. |
| 2002/0195588 A1 | 12/2002 | Marking et al. |

FOREIGN PATENT DOCUMENTS

| JP | 11-172245 A | 6/1999 |
| JP | 2994058 B2 | 10/1999 |
| JP | 2000-136381 A | 5/2000 |
| JP | 2000-178551 A | 6/2000 |
| JP | 2003-027053 A | 1/2003 |
| WO | WO-01/34723 A1 | 5/2001 |

*Primary Examiner*—Nimeshkumar D. Patel
*Assistant Examiner*—Donald L Raleigh
(74) *Attorney, Agent, or Firm*—Birch, Stewart, Kolasch & Birch, LLP

(57) ABSTRACT

An electroluminescent fluorescent substance, which is composed of electroluminescent fluorescent particles having an average particle diameter of 0.5 μm to 20 μm and a variation coefficient of particle diameter of 35% or less, and having at least 50% have stacking faults arranged in 10 layers or more at intervals of 5 nm or less, the particles containing copper $1\times10^{-4}$ to $1\times10^{-2}$ mol/mol and gold $1\times10^{-6}$ to $5\times10^{-4}$ mol/mol, to the particles; a sheet-shaped electroluminescence device, which has the electroluminescent fluorescent substance; and an electroluminescence device system; which utilizes the sheet-shaped electroluminescence device.

15 Claims, No Drawings

ELECTROLUMINESCENT FLUORESCENT SUBSTANCE

FIELD OF THE INVENTION

The present invention relates to an electroluminescent (EL) fluorescent substance, and a device and an illumination system to which the same is applied.

BACKGROUND OF THE INVENTION

For electroluminescent fluorescent particles, in many cases, preferably, zinc sulfide or calcium sulfide is used, or calcium strontium sulfide, zinc selenide, zinc sulfide selenide, or the like is used. It is thought that light emission is attained by a mechanism in which copper sulfide is formed inside particles for forming electron-hole pairs when a voltage is applied; electrons-holes are generated when an electric field is applied between copper sulfide and a matrix crystal, and they emit light by recombination. Accordingly, in a case, for example, of zinc sulfide crystal, which is most widely employed, decreasing the particle size thereof has been thought to be disadvantageous to attain higher luminance and higher durability based on high crystallinity. That is, to obtain high crystallinity, generally, a wurtzite structure is once formed at a high temperature of over 1,000° C. in the presence of a sufficient flux, to grow particles having an average particle diameter of 20 µm or greater, and then the particles are partially converted to a sphalerite structure, by a second sintering at a low temperature, or the like, to form stacking fault. It has been thought that copper sulfide is formed along dislocation on the stacking fault plane. It is known that an electroluminescent fluorescent substance having high luminance has a large particle diameter, and also stacking fault (for example, see U.S. Pat. No. 5,643,496, and JP-A-06-306355 ("JP-A" means unexamined published Japanese patent application)). For the above reason in the production, it is particularly difficult to attain a small particle, of diameter 20 µm or less, at high yields. For particles having small size, particles may be decreased in size by lowering the temperature or decreasing the amount of a flux. However, such particles have low crystallinity and low luminance, or they are degraded in durability, so that it has not been possible to produce any excellent fluorescent substance.

On the other hand, with regard to a method to improve an electroluminescent fluorescent substance in durability, there is disclosed a method using a specific dopant. For example, Japanese Patent No. 2994058 describes a technique of doping with gold, to improve durability; JP-A-11-172245 and JP-A-2000-136381 describe techniques of doping with cesium, to improve durability; Japanese Patent No. 2994058 describes a technique of doping with beryllium, to improve durability; and JP-A-2000-178551 and JP-A-2002-053854 describe techniques of sintering zinc sulfide in an antimony or bismuth atmosphere, to improve durability. However, the effects of these techniques are insufficient, and even a decrease in initial luminance has been sometimes involved.

When small-size particles are used as an EL fluorescent substance, therefore, such particles are expected to have an advantage, for example, in forming a uniform fluorescent substance coating layer and decreasing the same in thickness. Due to a decrease in luminance and degradation of durability, however, it has been considered that no preferable electroluminescent fluorescent substance can be obtained.

SUMMARY OF THE INVENTION

The present invention resides in an electroluminescent fluorescent substance, which is composed of electroluminescent fluorescent particles having an average particle diameter of 0.5 µm to 20 µm and a variation coefficient of particle diameter of 35% or less, and having at least 50% have stacking faults arranged in 10 layers or more at intervals of 5 nm or less, said particles containing copper $1\times10^{-4}$ to $1\times10^{-2}$ mol/mol and gold $1\times10^{-6}$ to $5\times10^{-4}$ mol/mol, to the particles.

Further, the present invention resides in an electroluminescent fluorescent substance, which is composed of electroluminescent fluorescent particles having an average particle diameter of 0.5 µm to 20 µm and a variation coefficient of particle diameter of 35% or less, and having at least 50% have stacking faults arranged in 10 layers or more at intervals of 5 nm or less, said particles containing copper $1\times10^{-4}$ to $1\times10^{-2}$ mol/mol and cesium $1\times10^{-6}$ to $5\times10^{-4}$ mol/mol, to the particles.

Further, the present invention resides in an electroluminescent fluorescent substance, which is composed of electroluminescent fluorescent particles having an average particle diameter of 0.5 µm to 20 µm and a variation coefficient of particle diameter of 35% or less, and having at least 50% have stacking faults arranged in 10 layers or more at intervals of 5 nm or less, said particles containing copper $1\times10^{-4}$ to $1\times10^{-2}$ mol/mol and bismuth and/or antimony $1\times10^{-6}$ to $5\times10^{-4}$ mol/mol, to the particles.

Further, the present invention resides in an electroluminescent fluorescent substance, which is composed of electroluminescent fluorescent particles having an average particle diameter of 0.5 µm to 20 µm and a variation coefficient of particle diameter of 35% or less, and having at least 50% have stacking faults arranged in 10 layers or more at intervals of 5 nm or less, said particles containing copper $1\times10^{-4}$ to $1\times10^{-2}$ mol/mol and aluminum $3\times10^{-5}$ to $2\times10^{-2}$ mol/mol, to the particles.

Further, the present invention resides in an electroluminescent fluorescent substance, which is composed of electroluminescent fluorescent particles having an average particle diameter of 0.5 µm to 20 µm and a variation coefficient of particle diameter of 35% or less, and having at least 50% have stacking faults arranged in 10 layers or more at intervals of 5 nm or less, said particles containing copper $1\times10^{4}$ to $1\times10^{-2}$ mol/mol and platinum $3\times10^{-6}$ to $2\times10^{-4}$ mol/mol, to the particles.

Further, the present invention resides in a sheet-shaped electroluminescence device, which comprises:
the electroluminescent fluorescent substance according to any one of the above; and
a transparent electrically conductive film having a transparent electrode with a surface resistance of 10 $\Omega/\square$ or less.

Further, the present invention resides in an electroluminescence device system, wherein the sheet-shaped electroluminescence device according to the above is driven with an AC power source of an effective voltage of 100 V or higher, with 800 Hz or higher, and at a device electric power consumption of 40 W/m² or more.

Other and further features and advantages of the invention will appear more fully from the following description.

DETAILED DESCRIPTION OF THE INVENTION

According to the present invention, the following means are provided:

(1) An electroluminescent fluorescent substance, which is composed of electroluminescent fluorescent particles having an average particle diameter of 0.5 µm to 20 µm and a variation coefficient of particle diameter of 35% or less, and having at least 50% have stacking faults arranged in 10 layers or more at intervals of 5 nm or less, said particles containing copper $1\times10^{-4}$ to $1\times10^{-2}$ mol/mol and gold $1\times10^{-6}$ to $5\times10^{-4}$ mol/mol, to the particles.

(2) An electroluminescent fluorescent substance, which is composed of electroluminescent fluorescent particles having an average particle diameter of 0.5 µm to 20 µm and a variation coefficient of particle diameter of 35% or less, and having at least 50% have stacking faults arranged in 10 layers or more at intervals of 5 nm or less, said particles containing copper $1\times10^{-4}$ to $1\times10^{-2}$ mol/mol and cesium $1\times10^{-6}$ to $5\times10^{-4}$ mol/mol, to the particles.

(3) An electroluminescent fluorescent substance, which is composed of electroluminescent fluorescent particles having an average particle diameter of 0.5 µm to 20 µm and a variation coefficient of particle diameter of 35% or less, and having at least 50% have stacking faults arranged in 10 layers or more at intervals of 5 nm or less, said particles containing copper $1\times10^{-4}$ to $1\times10^{-2}$ mol/mol and bismuth and/or antimony $1\times10^{-6}$ to $5\times10^{-4}$ mol/mol, to the particles.

(4) An electroluminescent fluorescent substance, which is composed of electroluminescent fluorescent particles having an average particle diameter of 0.5 µm to 20 µm and a variation coefficient of particle diameter of 35% or less, and having at least 50% have stacking faults arranged in 10 layers or more at intervals of 5 nm or less, said particles containing copper $1\times10^{-4}$ to $1\times10^{-2}$ mol/mol and aluminum $3\times10^{-5}$ to $2\times10^{-2}$ mol/mol, to the particles.

(5) An electroluminescent fluorescent substance, which is composed of electroluminescent fluorescent particles having an average particle diameter of 0.5 µm to 20 µm and a variation coefficient of particle diameter of 35% or less, and having at least 50% have stacking faults arranged in 10 layers or more at intervals of 5 nm or less, said particles containing copper $1\times10^{-4}$ to $1\times10^{-2}$ mol/mol and platinum $3\times10^{-6}$ to $2\times10^{-4}$ mol/mol, to the particles.

(6) A sheet-shaped electroluminescence device, comprising, e.g. which device is formed by using:

the electroluminescent fluorescent substance according to any one of the above items (1) to (5); and a transparent electrically conductive film having a transparent electrode with a surface resistance of 10 Ω/□ or less.

(7) An electroluminescence device system, wherein the sheet-shaped electroluminescence device according to the above item (6) is driven with an AC power source of an effective voltage of 100 V or higher, with 800 Hz or higher, and at a device electric power consumption of 40 W/m$^2$ or more.

The present invention will be explained in detail below.

As a result of diligent studies, the present inventor has found the following. Even when a small-size fluorescent (phosphor) particle powder, having an average particle diameter of at least 0.5 µm but not more than 20 µm, is used, an electroluminescence device using the particles can have increased luminance, as long as the variation coefficient of the particle diameter thereof is adjusted to 35% or less, and as long as at least 50% of the number of particles have high-density stacking faults in which 10 layers or more are arranged at intervals of 5 nm or less. As to the problem of degradation of the durability that such particles have had, it has been further found that, since the effect of the above dopant(s) on improvements in durability is remarkably greatly exhibited, compared with large-size particles or very-small-size particles with an average particle diameter of less than 0.5 µm, the problem with small-size particles can be unexpectedly overcome.

Further, when the particles are of small size, the number of contact points increases when a transparent electrically conductive film is bonded to a fluorescent particle dispersion layer containing such particles. In sites where the fluorescent particles and a transparent electrically conductive film come in direct contact with each other, an ITO film is liable to break, and an electroluminescence device easily deteriorates. The present inventor, having made diligent studies regarding this point, found that when the resistance of an electrically conductive film is decreased to 10 Ω/□ or less, the deterioration of the device by the breaking in contact sites can be decreased to a great extent.

Further, to drive an electroluminescence device, generally, an AC power source having an inverter circuit is used, and AC at approximately 100 V and 400 Hz is used. To attain high luminance, frequently a method in which the voltage is increased to 100 V or higher is employed. As a result of diligent studies, the present inventor has found that remarkably high luminance and excellent durability can be obtained when the above device uses a high-frequency power source of 800 Hz or higher, and has a device power consumption of 40 W/m$^2$ or more, even 100 W/m$^2$ or more.

The present invention has been attained based on the above findings.

<Fluorescent Particles>

The particles constituting the fluorescent substance in the present invention have an average particle diameter of 0.5 to 20 µm, and the average particle diameter is preferably 0.5 to 15 µm, more preferably 1.0 to 12.0 µm, and particularly preferably 2.0 to 10.0 µm. The variation coefficient of the particle diameter (particle size) in the present invention can be calculated from a formula: {(a standard deviation of distribution of volume weighed particle size)/(a volume weighed average particle size)×100 (%)}; and it is 35% or less. The variation coefficient of the particle diameter is preferably 30% or less, more preferably 25% or less, and a smaller variation coefficient is further preferred. Further, the variation coefficient of the particle diameter is still further preferably 3 to 25%, particularly preferably 3 to 20%. The particle size of an individual particle is represented by a diameter of a sphere which is obtained by conversion of the volume of said particle to a sphere. For the particle size, a photograph of particles may be taken to measure each particle, the particles may be optically measured for their distribution, or a distribution may be determined on the basis of a sedimentation rate. Further, at least 50% (preferably 70 to 100%) of the fluorescent particles according to the present invention have stacking faults in which 10 layers or more are arranged at intervals of 5 nm or less. By bringing the variation coefficient and stacking faults of the particles into the above ranges, the luminance of small size particles is no longer decreased even when the particles have an average particle diameter of 20 µm or less.

The base (host) material of electroluminescent fluorescent substance (EL fluorescent particles), which can be preferably used in the present invention, is specifically a semiconductor fine-particle that is composed of one or more selected from the group consisting of elements of the II group and elements of the VI group, or one or more selected from the group consisting of elements of the III group and elements of the V group, and these elements may be selected at will in accordance with a required luminescence wavelength region. Herein, the II, III, V and VI groups are those in the periodic table of elements. As the semiconductor, II-VI group or III-V group compound semiconductors are preferable. Examples of these compounds include CdS, CdSe, CdTe, ZnS, ZnSe, ZnTe, CaS, MgS, SrS, GaP, GaAs, and mixed crystals of these compounds. In particular, ZnS, ZnSe, ZnSSe, CaS, and CaSrS can be preferably used. Among these, ZnS and ZnSSe are particularly preferable.

For a luminescence center, donor acceptor centers of Cu with Cl, Br, I, Al, etc., metal ions of Mn, Cr, etc., and rare earth metals can be preferably used. In the present invention, the fluorescent particles contain, based on the particles, copper $1\times10^{-4}$ to $1\times10^{-2}$ mol/mol, preferably $3\times10^{-4}$ to $5\times10^{-3}$ mol/mol. For the copper, copper sulfate, copper sulfide, copper nitrate, etc., can be preferably used.

When several fluorescent substances are used by selecting the above matrix materials, there can be obtained luminescence in white in the range of $0.3<x<0.4$ and $0.3<y<0.4$ in the chromaticity diagram, substantially without using any dye or fluorescent dye.

Electroluminescent fluorescent particles that can be used in the present invention can be formed by a sintering (firing) method (a solid phase method) widely employed in the field of this art. For example, when zinc sulfide is used, a fine-particle powder (generally called "green (or raw) powder") having a size of 10 nm to 50 nm is prepared by a liquid phase method, the resultant powder is used as primary particles, an impurity called an activator is incorporated thereto, and the resultant mixture is subjected to a first sintering together with a flux in a crucible at a high temperature of 900° C. to 1,300° C. for 30 minutes to 10 hours, to obtain particles.

The intermediate fluorescent particle obtained by the first sintering step is repeatedly washed with ion exchanged water, to remove alkali metals and alkaline-earth metals and an excess of the activator and co-activator.

Then, the resultant intermediate fluorescent powder is subjected to a second sintering step. In the second sintering step, a heating (annealing) is carried out at a lower temperature (i.e. 500 to 800° C.) than that in the first sintering step, for a short period of time of 30 minutes to 3 hours.

By the two sintering steps, a large number of stacking faults are generated in the fluorescent particle. In order for the fluorescent particle to be finer and to contain more stacking faults, it is preferred to select conditions for the first and second sintering steps appropriately.

Further, the application of impact having a strength in some range to the sintered product obtained by the first sintering step, makes it possible to largely increase the density of the stacking faults, without breaking the particle. The method for applying the impact is preferably a method of causing the intermediate fluorescent particles to contact each other to mix the same, a method (i.e., ball mill method) of blending spheres made of alumina or the like with the particles to mix the same, a method of accelerating the particles to make these collide with each other, a method of applying ultrasonic waves to the particles, or a method of applying hydrostatic pressure to the fluorescent particles, or the like.

Then, the thus-obtained intermediate fluorescent substances is etched with an acid such as HCl, to remove a metal oxide(s) adhered onto the surface. Further, copper sulfide, i.e. the activator compound, adhering to the surface of the particle is washed with KCN, to remove. Then, the intermediate fluorescent substance is dried, to yield an EL fluorescent substance.

Further, taking zinc sulfide as an example, to introduce a multiple twin crystal structure into a fluorescent substance crystal, it is preferred to employ a hydrothermal synthesis method as a method of forming fluorescent particles. In a hydrothermal synthesis system, particles are dispersed in a well-stirred aqueous solvent, and zinc ion and/or sulfur ion for causing the particles to grow is/are added from an outside of a reactor, in the form of an aqueous solution at a controlled flow rate, for a predetermined time period. In this system, therefore, the particles have free mobility in the aqueous solvent, and the added ion(s) is/are capable of being diff-used in the water to cause uniform growth of the particles, so that the concentration distribution of an activator or a co-activator inside each particle can be changed and that there can be obtained particles that cannot be obtained by a sintering method. In controlling a particle size distribution, further, the process of forming cores and the process of the growth can be distinctly separated, and the particle size distribution can be controlled by arbitrarily controlling the degree of super saturation during the growth of the particles, so that monodisperse zinc sulfide particles having a narrow size distribution can be obtained. For adjusting the particle size and materializing the multiple twin crystal structure, preferably, an Ostwald ripening step is inserted between the process of forming cores and the process of the growth.

ZnS crystals have extremely low solubility to water. Such property is indeed very disadvantage to a method of growing particles upon the ionic reaction in an aqueous solution. A solubility of ZnS crystals to water increases as a temperature of water is elevated. However, water turns a supercritical state at 375° C. or higher. In the supercritical state, a solubility of ions extremely reduces. Accordingly, a temperature for preparing particles is preferably 100° C. or higher but not more than 375° C., more preferably in the range of 200° C. or higher but lower than 375° C. A period of time to be spent for preparing particles is preferably within 100 hours, more preferably within 12 hours, but 5 minutes or more.

It is also preferable to use a chelating agent in the present invention, as another method of increasing the solubility of zinc sulfide or the like in water. As a chelating agent of Zn ion, those having an amino group and/or a carboxyl group are preferable. Specific examples of the chelating agent include ethylenediaminetetraacetic acid (hereinafter referred to as EDTA), N,2-hydroxyethylethylenediaminetriacetic acid (hereinafter referred to as EDTA-OH), diethylenetriaminepentaacetic acid, 2-aminoethylethylene-glycol-tetraacetic acid, 1,3-diamino-2-hydroxypropanetetraacetic acid, nitrilotriacetic acid, 2-hydroxyethyliminodiacetic acid, iminodiacetic acid, 2-hydroxyethylglycine, ammonia, methylamine, ethylamine, propylamine, diethylamine, diethylenetriamine, triaminotriethylamine, allylamine, and ethanolamine.

Further, when there is employed a direct precipitation reaction using metal ion and chalcogen anion as constituents, without using any precursors for constituting elements, it is required to rapidly mix solutions of these two constituents, and it is preferred to employ a double-jet type mixing apparatus.

The fluorescent substance-forming method that can be used in the present invention can be selected from gaseous phase methods, such as a laser ablation method, a CVD method, a plasma CVD method, a method that is a combination of sputtering or resistance-heating, an electron beam method and flowing oil surface vapor deposition; and liquid phase methods, such as a double decomposition method, a method based on pyrolysis of a precursor, a reversed micelle method, a method that is a combination of any of these methods with high-temperature sintering, and a freeze dry method.

In these methods, by controlling the conditions for preparing the particles, can be obtained fluorescent particles having a size of at least 0.5 μm but not more than 20 μm which particles can be used in the present invention.

The fluorescent particle preferably has, on the surface of the particle, a non-luminous shell layer. The formation of the shell layer is preferably conducted by a chemical method following the preparation of a semiconductor fine particle, which will be a core of the fluorescent particle. The thickness of the shell layers is preferably 0.01 µm or more, more preferably 0.01 µm or more but 1.0 µm or less.

The non-luminous shell layer can be made of an oxide, nitride, or oxide/nitride, or a substance that has the same composition as those formed on the host fluorescent particle but contains no luminescence center. The shell layer can also be formed by epitaxially growing, on the host fluorescent particle material, a substance which has a different composition from that of the particle.

Examples of available methods of forming the non-luminescent shell layer include a vapor phase method, such as a combination of fluidized oil surface evaporation with an electron beam method, sputtering or resistance heating method, a laser ablation method, a CVD (chemical vapor deposition) method, or a plasma CVD method; a liquid phase method, such as a double decomposition method, a sol-gel method, an ultrasonic chemical method, a method by thermal decomposition reaction of a precursor, a reversed micelle method, a combination method of any of these methods with high temperature sintering, a hydrothermal synthesis method, a urea melting method, and a freeze drying method; and a spray thermal decomposition method.

Particularly, the hydrothermal synthesis method, the urea melting method and the spray thermal decomposition method, which can be preferably used for the formation of the fluorescent particle, are also preferable for the synthesis of the non-luminescent shell layer.

For example, in the case that the non-luminescent shell layer is formed on the surface of a zinc sulfide fluorescent particle by the hydrothermal synthesis method, the zinc sulfide fluorescent substance, which will be a core particle, is added to a solvent and suspended therein. In the same manner as in the case of forming the particle, a solution containing a metal ion, which will be a material of the non-luminescent shell layer, and, if necessary, an optional anion is added to a reactor from the outside thereof at a controlled flow rate in a prescribed time period. By stirring the inside of the reactor sufficiently, the particle can be freely moved in the solvent and further the added ions diffuse in the solvent to permit homogeneous growth of the particle. Consequently, a non-luminous shell layer can be homogeneously formed on the surface of the core particle. If necessary, the thus-obtained particle is sintered, thereby synthesizing a zinc sulfide fluorescent particle having, on the surface thereof, the non-luminous shell layer.

The fluorescent substance of the present invention contains, as a dopant, gold (Au), cesium (Cs), bismuth (Bi) and/or antimony (Sb), aluminum (Al), or platinum (Pt).

For example, when the particles are formed by a sintering method, the method for adding the dopant includes a method in which an aqueous solution containing dopant ion is kneaded with primary particles of size several tens of nanometers, and the kneaded product is dried and then sintered; and a method in which the dopant is added together with a flux during sintering at a low temperature. In the liquid phase growth, during the crystal growth, there is employed a method in which an aqueous solution of dopant ion is added during the growth and ripening of the particles. In the gaseous phase method, such as CVD or the like, use can be preferably made, for example, of a method in which dopant ion in a precursor state is fed into a reactor by using a carrier gas, or a method in which the dopant is incorporated into a target in advance in vapor deposition.

For the gold, a gold complex, such as chloroauric acid, or a gold powder can be preferably used. The doping dosage of gold to the fluorescent particle is preferably $1\times10^{-6}$ to $5\times10^{-4}$ mol/mol, particularly preferably $3\times10^{-6}$ to $1\times10^{-5}$ mol/mol.

For the cesium, cesium chloride, cesium bromide, cesium nitrate, cesium sulfate, etc., can be preferably used. The doping dosage of cesium to the fluorescent particle is preferably in the range of $1\times10^{-6}$ to $5\times10^{-4}$ mol/mol, particularly preferably $3\times10^{-6}$ to $1\times10^{-4}$ molmol.

For the bismuth and/or antimony, use can be preferably made of a method in which a crystal or compound thereof is volatilized by heating it to dope into the fluorescent particles in the presence of an atmosphere thereof. The doping dosage thereof to the fluorescent particle is preferably $1\times10^{-6}$ to $5\times10^{-4}$ mol/mol, particularly preferably $3\times10^{-6}$ to $1\times10^{-4}$ mol/mol.

For the aluminum, aluminum halide, aluminum sulfate, or the like can be preferably used. The content of aluminum in the fluorescent particle powder to the fluorescent particle is preferably $3\times10^{-5}$ to $2\times10^{-2}$ mol/mol, particularly preferably $5\times10^{-5}$ to $1\times10^{-2}$ mol/mol.

For the platinum, $Na_2[Pt(OH)_6]$, or the like can be preferably used. The content of platinum in the fluorescent particle powder to the fluorescent particle is preferably $3\times10^{-6}$ to $2\times10^{-4}$ mol/mol, particularly preferably $5\times10^{-6}$ to $1\times10^{-4}$ mol/mol.

<Transparent Electrically Conductive Film>

In the present invention, the transparent electrode can be obtained by attaching, or forming a film of a transparent electrically conductive substance, such as indium-tin oxide (ITO), tin oxide, antimony-doped tin oxide, zinc-doped tin oxide, zinc oxide, or the like, on not only a glass substrate but also a transparent film formed of polyethylene terephthalate, triacetyl cellulose base, or the like, according to a vapor deposition, coating, printing, or some other method.

The method for forming the transparent electrically conductive film may be a gaseous phase method, such as sputtering, or vacuum vapor deposition. The film may be formed by applying or screen-printing ITO, etc., in the form of a paste, or by heating a film.

Further, the transparent electrically conductive film may have a multi-layered structure in which a thin film of silver is sandwiched between high-refractive-constant layers. Further, conjugated polymers, such as polyaniline, polypyrrole, etc., are included.

In the present invention, a comb-shaped or grid-shaped network metallic thin wire is further arranged in the above transparent electrically conductive portion, to improve electric conductivity. For a metal or alloy narrow wire, copper, silver or aluminum is preferably used. While the metallic thin wire may have any size, the size is preferably approximately between 0.1 µm and 100 µm. The metallic thin wire is preferably arranged at intervals of 50 µm to 1,000 µm, particularly preferably at intervals of 100 µm to 500 µm. When the network metallic thin wire is arranged, the light transmittance decreases. However, it is important to minimize the decrease so that the decrease is as small as possible, and it is preferred to ensure a transmittance of at least 90% and less than 100%. The network metallic thin wire is stacked separately from the substrate with the above transparent electrically conductive film formed thereon, whereby the transparent electrically conductive film in the present invention can be formed. A metallic thin wire mesh may be attached onto the transparent electrically conductive film, or an electrically conductive substance such as ITO or the like may be applied or vapor-deposited on a film through a metallic thin wire formed on the film.

The surface resistance of the thus-formed transparent electrode is preferably 10 Ω/□ or less, particularly preferably 3 Ω/□ or less. In this manner, breaking of portions where the fluorescent particles and the transparent electrically conductive film come in contact can be decreased, and the deterioration of the device can be decreased to a great extent.

<Sealing/Water Absorption>

Preferably, the EL device of the present invention is finally finished using a proper sealing material, to preclude influences of humidity and oxygen in external environments. When the substrate itself for the device has sufficient sealing properties, preferably, a sealing sheet is stacked above the fabricated device, and a curing material such as an epoxy is employed in circumferential portions for the sealing. Further, to prevent curling of the device in the form of a sheet from occurring, a sealing sheet may be arranged on each surface. When the substrate of the device has moisture permeability, it is required to arrange a sealing sheet on each surface.

While the above sealing sheet can be selected from a glass, a metal, a plastic film, etc., as required depending upon purposes, there can be preferably used a multi-layered moisture-proof film having a layer formed from silicon oxide and a layer formed from an organic polymer compound, as disclosed, for example, in JP-A-2003-249349; or ethylene chloride trifluoride, etc., can be also preferably used.

The above sealing step is preferably carried out in a vacuum or inert-gas-substituted atmosphere, as described in JP-B-63-27837 ("JP-B" means examined Japanese patent publication), and it is important to fully decrease the water content before the sealing step is carried out, as described in JP-A-5-166582.

When the above EL device is fabricated, preferably, a water-absorbing layer is formed in a position nearer to the inside than the position of the sealing sheet. The water-absorbing layer is preferably formed of a material highly capable of absorbing water and highly capable of retaining water, such as nylon (polyamide), polyvinyl alcohol, or the like. It is also important to have high transparency. Materials, such as cellulose and paper, can also be preferably used as long as they have high transparency.

As described in Japanese Patent No. 2756044 and JP-A-2002-527569, use can be also preferably made of combination of coating the fluorescent particles with a metal oxide or nitride, with moisture prevention by the sealing sheet, to improve moisture-proof properties.

<White/Fluorescence Dyes>

The application or usage of the present invention is not particularly limited, but taking the application as a light source into consideration, preferably the luminescent color is a white color.

As a method of outputting a white luminescent color, use can be preferably made, for example, of a method of using fluorescent particles capable of self-emitting a white light such as zinc sulfide fluorescent substance activated with copper and manganese and gradually cooled after sintering (baking), or a method of mixing two or more kinds of fluorescent substances capable of emitting three primary colors or complementary colors from each other. For example, a combination of blue, green and red, and a combination of bluish green and orange may be used, to obtain a white light. It is also preferable to use a method of making into a white color according to the steps of: using a fluorescent substance which emits a blue or bluish green light together with a fluorescent pigment or a fluorescent dye, thereby to wavelength-convert (emit) a part of the emission to green or red, as described in JP-A-7-166161, JP-A-9-245511 and JP-A-2002-62530. A rhodamine-series fluorescence dye can be preferably used as the fluorescence dye. Further, as CIE chromaticity coordinate (x, y), it is preferable that the value x is in the range of 0.30 to 0.4 and the value y is in the range of 0.30 to 0.40.

<Ultraviolet Absorbent>

In the present invention, an inorganic compound, such as cerium oxide, etc., as described in JP-A-9-22781 may be used, and an organic compound can be more preferably used.

In the present invention, as an ultraviolet ray absorbent, it is preferred to use a compound having a triazine skeleton high in a molar extinction coefficient. For example, those described in the following patent publications can be used.

These are used preferably in a photographic light-sensitive material, and are also effective in the present invention. For example, use can be made of any of the compounds described in JP-A-46-3335, JP-A-55-152776, JP-A-5-197074, JP-A-5-232630, JP-A-5-307232, JP-A-6-211813, JP-A-8-53427, JP-A-8-234364, JP-A-8-239368, JP-A-9-31067, JP-A-10-115898, JP-A-10-147577, JP-A-10-182621, German Patent No. 19739797A, European Patent No. 711804A, JP-T-8-501291 ("JP-T" means published searched patent publication), and the like.

It is important that the ultraviolet absorbent should be positioned such that the fluorescent particles and the fluorescence dye do not absorb ultraviolet ray. The ultraviolet absorbent can be used in a manner in which it is added to or dispersed in a binder to which the fluorescent particles and the fluorescence dye are dispersed, or in which it is incorporated into the moisture-proof film or water-absorbing film formed in a position nearer to the outside than the position of the transparent electrode layer. Naturally, the ultraviolet absorbent may be used as an ultraviolet absorbent layer formed by applying it onto the film surface.

<Power Source>

Conditions preferred for driving the EL device of the present invention will be described below.

The voltage range is preferably at least 100 V but not more than 300 V, particularly preferably at least 120 V but not more than 250 V. The frequency range for the driving is preferably at least 800 Hz but not more than 3 kHz, more preferably at least 1 kHz but not more than 2.5 kHz.

The preferable power consumption range is 40 W/m$^2$ or higher, particularly preferably from 70 W/m$^2$ to 300 W/m$^2$.

As the device is deteriorated, the luminance thereof is decreased, and in this case, the capacitance and the sagging power consumption of the device are also decreased. To compensate these, it is preferred to perform the compensation mainly based on the frequency, in view of the efficiency and prevention of a change in chromaticity.

According to the present invention, the electroluminescent fluorescent substance and the device to which the same is applied, each exhibit high luminance and are excellent in durability.

Further, the light source of the present invention to which the electroluminescent fluorescent substance and the device is applied, can exhibit high luminance and high durability.

The present invention will be described in more detail based on examples given below, but the invention is not meant to be limited by these.

EXAMPLES

Example 1

(Preparation of Fluorescent Particle A)

To dry powder of 25 g of zinc sulfide (ZnS) particulate powder of average particle diameter 20 nm, to which was added copper sulfate in an amount of 0.07 mol/mol based on ZnS, was added appropriate amounts of NaCl, $MgCl_2$, and ammonium chloride ($NH_3Cl$) powders as fluxes, and magnesium oxide powder in an amount of 10 mass % to the fluorescent powder. The resultant powder was put into a crucible made of alumina, followed by sintering at 1,150° C. for 2 hours and then cooling. Thereafter, the powder was taken out, followed by pulverization in a ball mill and dispersion. Thereto were added $ZnCl_2$ in an amount of 5 g and copper sulfate in an amount of 0.10 mol/mol based on ZnS. Thereafter, 1 g of $MgCl_2$, 0.25 g of sulfur were added thereto, to prepare a dry powder. Again, the powder was put into an alumina crucible and sintered at 700° C. for 6 hours.

The particles after the sintering were again pulverized, followed by dispersion and sedimentation in $H_2O$ of temperature 40° C. The supernatant was removed by decantation, followed by washing. Thereafter, a 10% solution of hydrochloric acid was added thereto, followed by dispersion and sedimentation. The supernatant was removed and unnecessary salts were removed, followed by drying. Further, the resultant particles were washed with a 10% KCN solution heated to 70° C., to remove Cu ions and others from the surface thereof. Further, surface layers corresponding to 10 mass % of the entire particles were removed by etching with 6 N hydrochloric acid.

The thus-obtained particles were sieved, to obtain small size particles.

The thus-obtained fluorescent particles had an average particle diameter of 9.8 μm and a coefficient of deviation of 23%. Further, some portion of the resultant particles were pulverized in a mortar, and pulverized pieces having a thickness of 0.2 μm or less were taken out. The pieces were observed through an electron microscope, under an accelerating voltage condition at 200 kV, to show that at least 80% of the pulverized pieces contained portions having stacking faults in which at least 10 layers of faults were arranged at intervals of 5 nm or less.

(Preparation of Fluorescent Particle B)

To dry powder of 25 g of zinc sulfide (ZnS) particulate powder of average particle diameter 20 nm, to which was added copper sulfate in an amount of 0.07 mol/mol based on ZnS, was added appropriate amounts of NaCl, $MgCl_2$, and ammonium chloride ($NH_3Cl$) powders as fluxes, and magnesium oxide powder in an amount of 20 mass % to the fluorescent powder. The resultant powder was put into a crucible made of alumina, followed by sintering at 1,250° C. for 6 hours and then cooling. Thereafter, the powder was taken out, followed by pulverization in a ball mill and dispersion. Thereto were added $ZnCl_2$ in an amount of 5 g and copper sulfate in an amount of 0.10 mol/mol based on ZnS. Thereafter, 1 g of $MgCl_2$, 0.25 g of sulfur were added thereto, to prepare a dry powder. Again, the powder was put into an alumina crucible and sintered at 700° C. for 6 hours.

The particles after the sintering were again pulverized, followed by dispersion and sedimentation in $H_2O$ of temperature 40° C. The supernatant was removed by decantation, followed by washing. Thereafter, a 10% solution of hydrochloric acid was added thereto, followed by dispersion and sedimentation. The supernatant was removed and unnecessary salts were removed, followed by drying. Further, the resultant particles were washed with a 10% KCN solution heated to 70° C., to remove Cu ions and others from the surface thereof. Further, surface layers corresponding to 10 mass % of the entire particles were removed by etching with 6 N hydrochloric acid.

The thus-obtained fluorescent particles had an average particle diameter of 25.3 μm and a coefficient of deviation of 43%. Further, some portion of the resultant particles were pulverized in a mortar, and pulverized pieces having a thickness of 0.2 μm or less were taken out. The pieces were observed through an electron microscope, under an accelerating voltage condition at 200 kV, to show that at least 25% of the pulverized pieces contained portions having stacking faults in which at least 10 layers of faults were arranged at intervals of 5 nm or less.

(Preparation of Device)

$BaTiO_3$ fine-particle of average particle diameter 0.02 μm was dispersed in a 30-mass % cyano resin solution, and the aluminum sheet of thickness 75 μm was then coated with the resultant solution such that the thickness of the dielectric layer to be formed would be 25 μm, followed by drying at 120° C. for one hour using a hot air dryer.

The above fluorescent substance A or B, and a fluorescence dye FZ6013 (trade name) manufactured by SINLOIHI CO., LTD, were dispersed in a 30 mass % cyano resin solution, these were mixed so as to attain x=3.3±0.2 and y=3.4±0.2 in the CIE chromaticity coordinate, and the resultant mixture was applied by multilayer coating, onto a transparent electrically conductive film manufactured by Tobi Col, Ltd., such that a fluorescent substance layer would have a thickness of 40 μm. In this case, ITO having a surface resistance value of 100 Ω/□, manufactured by Tobi Col, Ltd., was used. The thus-obtained transparent film had a transmittance of approximately 90% at 530 nm.

The thus-produced aluminum sheet and transparent film were dried at 120° C. for one hour using a hot air dryer, and then stuck onto each other, so as to bring the dielectric layer into contact with the fluorescent layer. A heat roller of 150° C. temperature was utilized, to compress the resultant lamination thermally in vacuum.

Copper aluminum sheets each having a thickness of 80 μm were utilized, to take out terminals for connecting to the outside, from the transparent electrode and the backing electrode of the above-mentioned device. Then, the devices each were sandwiched between two water-absorbing sheets composed of a nylon-6 sheet and two moisture-proof films having a $SiO_2$ layer, and then thermally compressed and sealed.

The thus-prepared light-emitting devices of the present invention are designated to as Samples 1 and 7, respectively.

Samples 2 to 6 and 8 to 15, as shown in Table 1, were prepared, respectively, on the basis of the method of preparing the samples 1 and 7 in a manner in which a dopant was added during the first sintering or in a manner in which a two-zone sintering furnace was used and a vapor of a dopant was introduced into the sintering furnace through a separate heating zone. In Table 1, dopant amounts represent molar ratios (mol/mol) of dopants to ZnS.

The surface resistance value of a transparent electrically conductive film and the thickness of a fluorescent substance layer were changed on the basis of the sample 1, and each sample was evaluated for luminance at its driving at 100 V and 1 kHz, and also evaluated for luminance half lifetime in the continuous emission of light. All the samples were evaluated by relative evaluation in which the result of the sample 1 was taken as 100. In this case, each device exhibited a power consumption of 80±10 W/m².

A luminance photometer BM-7 (trade name) manufactured by Topcon Corporation was used for the luminance measurement. For the luminance half lifetime, each device was continuously driven under the above conditions in an environment having a room temperature of 25° C. and a relative humidity of 60%, to determine a time period that passed until the luminance came to be a half of the initial luminance.

Table 1 shows the results.

the transparent electrically conductive film was decreased, by providing a thin wire structure that was formed by vapor deposition of Ni thereon of wire width 20 μm and wire height 2 μm.

Each of the thus-prepared samples 16 to 21 was tested and evaluated for luminance at its driving at 100 V and 1 kHz and for luminance half lifetime in the continuous emission of light, in the same manner as in Example 1. All the samples were evaluated by relative evaluation in which the result of the sample 1 was taken as 100. Table 2 shows the results.

TABLE 1

| Sample | Fluorescent substance sample | Average particle diameter Variation coefficient | Frequency of stacking faults contained | Dopant (mol/mol) | Luminance Life |
|---|---|---|---|---|---|
| 1 Comparative example | Fluorescent substance A | 9.8 μm 23% | 80% | None | 100 100 |
| 2 This invention | Fluorescent substance A type | 9.6 μm 25% | 80% | Au $2 \times 10^{-5}$ | 115 330 |
| 3 This invention | Fluorescent substance A type | 9.3 μm 23% | 70% | Cs $3 \times 10^{-5}$ | 100 280 |
| 4 This invention | Fluorescent substance A type | 10.1 μm 26% | 75% | Bi $3 \times 10^{-5}$ | 110 270 |
| 5 This invention | Fluorescent substance A type | 9.9 μm 22% | 75% | Sb $3 \times 10^{-5}$ | 105 210 |
| 6 This invention | Fluorescent substance A type | 10.3 μm 23% | 80% | Al $2 \times 10^{-5}$ | 115 280 |
| 7 Comparative example | Fluorescent substance B | 25.3 μm 43% | 25% | None | 105 180 |
| 8 Comparative example | Fluorescent substance B type | 26 μm 40% | 30% | Au $2 \times 10^{-5}$ | 95 200 |
| 9 Comparative example | Fluorescent substance B type | 24.3 μm 38% | 30% | Cs $3 \times 10^{-5}$ | 100 190 |
| 10 Comparative example | Fluorescent substance B type | 25.3 μm 41% | 35% | Bi $3 \times 10^{-5}$ | 100 180 |
| 11 Comparative example | Fluorescent substance B type | 24.3 μm 43% | 30% | Sb $3 \times 10^{-5}$ | 95 200 |
| 12 Comparative example | Fluorescent substance B type | 26.1 μm 39% | 30% | Al $1 \times 10^{-3}$ | 90 210 |
| 13 Comparative example | Fluorescent substance A type | 9.6 μm 24% | 80% | Au $5 \times 10^{-7}$ | 100 120 |
| 14 Comparative example | Fluorescent substance A type | 8.9 μm 29% | 75% | Au $1 \times 10^{-3}$ | 60 140 |
| 15 This invention | Fluorescent substance A type | 9.3 μm 24% | 75% | Bi and Sb each $3 \times 10^{-5}$ | 110 280 |

As is apparent from the results in Table 1, it has been found that the samples 2 to 6 and 15 (Examples according to this invention) had small particle sizes, compared with the samples 7 to 12 (Comparative Examples) having large particle sizes, but they had high luminance and long lifetimes and were excellent in durability. Further, even if the particle size was small, no improvement was found in luminance and durability with regard to the samples 13 and 14 (Comparative Examples) in which the amount of the dopant was outside the range defined in the present invention, and it has been found that the luminance was decreased with regard to the sample 14 (Comparative Example) in which the amount of the dopant was larger than the range defined in the present invention.

Example 2

Samples 16 to 21 were prepared, respectively, in the same manner as in the sample device 2 according to the present invention and the sample device 8 for comparison each prepared in Example 1, except for changing the surface resistance value of the transparent electrode, as shown in Table 2.

As a transparent electrically conductive film, an ITO film having a surface resistance value of 300 Ω/□, manufactured by Tobi Col, Ltd., was used. The surface resistance value of

TABLE 2

| Device sample No. | Devise No. on which the sample was based | Resistance value of ITO | Luminance Life |
|---|---|---|---|
| 2 | 2 | 100 Ω/□ | 115 330 |
| 16 | 2 | 30 Ω/□ | 115 340 |
| 17 | 2 | 3 Ω/□ | 125 400 |
| 18 | 2 | 0.5 Ω/□ | 130 430 |
| 8 | 8 | 100 Ω/□ | 95 230 |
| 19 | 8 | 30 Ω/□ | 100 235 |
| 20 | 8 | 3 Ω/□ | 105 245 |
| 21 | 8 | 0.5 Ω/□ | 110 255 |

As is apparent from the results shown in Table 2, it can be understood that the device can be remarkably improved in durability as the surface resistance value of the ITO film is decreased.

Example 3

The Samples 2 and 18 according to the present invention and the Samples 8 and 21 for comparison were relatively evaluated for luminance and luminance half lifetime, by changing the driving voltage and frequency of a power source to 150V and 400 Hz, 100 V and 1 kHz, 100 V and 2 kHz, 70 V and 500 Hz, and 70 V and 2 kHz. As a result, it has been found that the device of the present invention not only exhibits high luminance and excellent durability but also shows a small change in color tint, particularly under driving conditions of 100 V or higher and 1 kHz or higher, compared to the samples for comparison.

Example 4

The samples in Example 1 were tested in the same manner as above, except for under driving conditions of 70 V and 600 Hz. In particular, regarding the luminance half lifetime, the improvement was decreased to such an extent the difference in lifetime between the device of the present invention and the device for comparison was approximately 65% of the counterpart in Example 1. The power consumption of each device was $23\pm5$ W/m$^2$.

Example 5

Samples were prepared in the same manner as in the samples 2 to 6 and 8 to 12 in Example 1, excepted that platinum (Pt) was doped in place of the dopant utilized in the samples 2 to 6 and 8 to 12, by adding, during the first sintering, Na$_2$[Pt(OH)$_6$] in an amount of $5\times10^{-5}$ mol/mol to the ZnS. The resultant samples were tested and evaluated in the same manner as in Example 1. As a result, it can be understood that, in particular, in the cases of the devices having the particle diameter, particle size distribution, and stacking fault density, as defined in the present invention, could be observed high luminance and remarkable improvement in lifetime, which indicates that the present invention is effective. Further, the Pt content in that cases was determined by analysis, to be $3\times10^{-5}$ mol/mol, in the molar ratio to the ZnS Having described our invention as related to the present embodiments, it is our intention that the invention not be limited by any of the details of the description, unless otherwise specified, but rather be construed broadly within its spirit and scope as set out in the accompanying claims.

What is claimed is:

1. An electroluminescent fluorescent substance, which is composed of electroluminescent fluorescent particles having an average particle diameter of 0.5 μm to 20 μm and a variation coefficient of particle of 35% or less, and wherein at least 50% have stacking faults arranged in 10 layers or more at intervals of 5 nm or less, said particles containing copper in the concentration of $1\times10^{-4}$ to $1\times10^{-2}$ mol/mol and gold in the concentration of $1\times10^{-6}$ to $5\times10^{-4}$ mol/mol, to the particles.

2. A sheet-shaped electroluminescence device, comprising:
the electroluminescent fluorescent substance according to claim 1; and
a transparent electrically conductive film having a transparent electrode with a surface resistance of 10Ω/□ or less.

3. An electroluminescence device system, wherein the sheet-shaped electroluminescence device according to claim 2 is driven with an AC power source of an effective voltage of 100 V or higher, with 800 Hz or higher, and at a device electric power consumption of 40 W/m$^2$ or more.

4. An electroluminescent fluorescent substance, which is composed of electroluminescent fluorescent particles having an average particle diameter of 0.5 μm to 20 μm and a variation coefficient of particle diameter of 35% or less, and wherein at least 50% have stacking faults arranged in 10 layers or more at intervals of 5 nm or less, said particles containing copper in the concentration of $1\times10^{-4}$ to $1\times10^{-2}$ mol/mol and cesium in the concentration of $1\times10^{-6}$ to $5\times10^{-4}$ mol/mol, to the particles.

5. A sheet-shaped electroluminescence device, comprising:
the electroluminescent fluorescent substance according to claim 4; and
a transparent electrically conductive film having a transparent electrode with a surface resistance of 10Ω/□ or less.

6. An electroluminescence device system, wherein the sheet-shaped electroluminescence device according to claim 5 is driven with an AC power source of an effective voltage of 100 V or higher, with 800 Hz or higher, and at a device electric power consumption of 40 W/m$^2$ or more.

7. An electroluminescent fluorescent substance, which is composed of electroluminescent fluorescent particles having an average particle diameter of 0.5 μm to 20 μm and a variation coefficient of particle diameter of 35% or less, and wherein at least 50% have stacking faults arranged in 10 layers or more at intervals of 5 nm or less, said particles containing copper in the concentration of $1\times10^{-4}$ to $1\times10^{-2}$ mol/mol and at least one material selected from the group consisting of bismuth and antimony in a concentration of $1\times10^{-6}$ to $5\times10^{-4}$ mol/mol, to the particles.

8. A sheet-shaped electroluminescence device, comprising:
the electroluminescent fluorescent substance according to claim 7; and
a transparent electrically conductive film having a transparent electrode with a surface resistance of 10Ω/□ or less.

9. An electroluminescence device system, wherein the sheet-shaped electroluminescence device according to claim 8 is driven with an AC power source of an effective voltage of 100 V or higher, with 800 Hz or higher, and at a device electric power consumption of 40 W/m$^2$ or more.

10. An electroluminescent fluorescent substance, which is composed of electroluminescent fluorescent particles having an average particle diameter of 0.5 μm to 20 μm and a variation coefficient of particle diameter of 35% or less, and having at least 50% have stacking faults arranged in 10 layers or more at intervals of 5 nm or less, said particles containing copper in the concentration of $1\times10^{-4}$ to $1\times10^{-2}$ mol/mol and aluminum in the concentration of $3\times10^{-5}$ to $2\times10^{-2}$ mol/mol, to the particles.

11. A sheet-shaped electroluminescence device, comprising:
the electroluminescent fluorescent substance according to claim 10; and
a transparent electrically conductive film having a transparent electrode with a surface resistance of 10Ω/□ or less.

12. An electroluminescence device system, wherein the sheet-shaped electroluminescence device according to claim 11 is driven with an AC power source of an effective voltage of 100 V or higher, with 800 Hz or higher, and at a device electric power consumption of 40 W/m$^2$ or more.

13. An electroluminescent fluorescent substance, which is composed of electroluminescent fluorescent particles having an average particle diameter of 0.5 μm to 20 μm and a variation coefficient of particle diameter of 35% or less, and having at least 50% have stacking faults arranged in 10 layers or more at intervals of 5 nm or less, said particles containing copper in the concentration of $1 \times 10^{-4}$ to $1 \times 10^{-2}$ mol/mol and platinum in the concentration of $3 \times 10^{-6}$ to $2 \times 10^{-4}$ mol/mol, to the particles.

14. A sheet-shaped electroluminescence device, comprising:
   the electroluminescent fluorescent substance according to claim 13; and
   a transparent electrically conductive film having a transparent electrode with a surface resistance of 10Ω/□ or less.

15. An electroluminescence device system, wherein the sheet-shaped electroluminescence device according to claim 14 is driven with an AC power source of an effective voltage of 100 V or higher, with 800 Hz or higher, and at a device electric power consumption of 40 W/m$^2$ or more.

* * * * *